United States Patent
Tapper

(10) Patent No.: US 11,745,124 B2
(45) Date of Patent: Sep. 5, 2023

(54) CASSETTE FILTER HAVING A FILTER ELEMENT WITH SPECIAL FOLDING

(71) Applicant: Carl Freudenberg KG, Weinheim (DE)

(72) Inventor: Renate Tapper, Bensheim (DE)

(73) Assignee: CARL FREUDENBERG KG, Weinheim (DE)

( * ) Notice: Subject to any disclaimer, the term of this patent is extended or adjusted under 35 U.S.C. 154(b) by 3 days.

(21) Appl. No.: 17/409,812

(22) Filed: Aug. 24, 2021

(65) Prior Publication Data

US 2022/0062800 A1 Mar. 3, 2022

(30) Foreign Application Priority Data

Aug. 26, 2020 (EP) .................................. 20192924

(51) Int. Cl.
*B01D 29/21* (2006.01)

(52) U.S. Cl.
CPC .......... *B01D 29/21* (2013.01); *B01D 2201/12* (2013.01); *B01D 2201/30* (2013.01); *B01D 2201/605* (2013.01)

(58) Field of Classification Search
CPC .............. B01D 29/21; B01D 2201/12; B01D 2201/30; B01D 2201/605; B01D 46/121; B01D 46/523; B01D 46/522
See application file for complete search history.

(56) References Cited

U.S. PATENT DOCUMENTS

| | | | |
|---|---|---|---|
| 4,738,778 A | * 4/1988 | Taki | B01D 27/005 210/493.1 |
| 5,704,953 A | * 1/1998 | Stemmer | B01D 46/521 55/497 |
| 2007/0157589 A1 | 7/2007 | Haberkamp | |
| 2015/0007732 A1 | 1/2015 | Hasenfratz | |
| 2015/0107201 A1* | 4/2015 | Cornaglia | F02M 35/0215 493/405 |

(Continued)

FOREIGN PATENT DOCUMENTS

| | | |
|---|---|---|
| DE | 102012000470 A1 | 7/2013 |
| EP | 3646934 A1 | 5/2018 |
| WO | WO 2005/037408 A1 | 4/2005 |

(Continued)

*Primary Examiner* — Waqaas Ali

(74) *Attorney, Agent, or Firm* — LEYDIG, VOIT & MAYER LTD.

(57) ABSTRACT

A cassette filter for cleaning a fluid includes: a frame; and a plurality of filter elements having a filter medium provided with a folding. The plurality of filter elements are accommodated in a frame such that at least two adjoining filter elements of the plurality of filter elements are arranged at an acute angle to one another and form a V-shaped arrangement. Each of the plurality of filter elements has folded edges which are formed by fold peaks and fold valleys and extend perpendicularly to legs of the acute angle. Each filter element of the plurality of filter elements is provided with foldings such that a height of the respective filter element is smaller at all edge regions than a height in a central region of the respective filter element, and smaller folding surfaces than the central region result at the edge regions.

7 Claims, 3 Drawing Sheets

(56) References Cited

U.S. PATENT DOCUMENTS

2015/0174518 A1  6/2015  Caesar
2020/0139289 A1  5/2020  Tapper

FOREIGN PATENT DOCUMENTS

| WO | WO 2007/014602 A2 | 2/2007 |
| WO | WO 2013/185878 A1 | 12/2012 |
| WO | WO 2021122455 A1 | 6/2021 |

* cited by examiner

CASSETTE FILTER HAVING A FILTER ELEMENT WITH SPECIAL FOLDING

CROSS-REFERENCE TO PRIOR APPLICATION

Priority is claimed to European Patent Application No. EP 20 192 924.7, filed on Aug. 26, 2020, the entire disclosure of which is hereby incorporated by reference herein.

FIELD

The invention relates to a cassette filter.

BACKGROUND

Cassette filters are known from the prior art, for example from WO 2013/185878 A1 (see FIG. 7 therein). Cassette filters have a frame in which a plurality of filter elements is accommodated. As a rule, the filter elements consist of a pleated, that is, folded filter medium. The filter elements are accommodated in the frame in such a way that two filter elements adjoining one another are arranged at an acute angle to one another and thus have a V-shaped arrangement. As a general rule, the flow direction of the cassette filter goes from the wide side of the V to the tip of the V. Air to be filtered then enters the filter through the opening between two filter elements. A particular V-shaped arrangement of filter elements may be referred to as a filter package. Filter elements adjoining one another are connected to one another and sealed in the boundary region, for example with the aid of cross-members filled with adhesive. No air can flow into the filter in the region of the seal. The wider the seals, the higher the pressure differential of the filter. Narrower seals, however, would have a positive effect on the pressure loss of the filter.

In order to realize narrower seals, it is known to interlock the pleated filter elements. However, there is a problem in this regard since when glass fiber paper is used as the filter medium, there is a risk of the filter medium being destroyed due to its low mechanical strength. In an alternative solution, which provides a miter cut through the filter elements, a secure seal of the filter elements in the region of their miter can only be achieved with difficultly. A potential leakage point can easily arise here.

Folded filters whose fold heights are not uniform over the extent of the filter element are also known from the prior art. Adapting the fold heights of the folding portions makes it possible to adapt the filter element to a surrounding frame. Such folding is described for round filter cartridges and for rectangular particle filters in US 2007/0157589 A1. DE 10 2012 000 470 A1 describes this for air filter elements for motor vehicles which are rectangular in plan view.

US 2015/0107201 A1 describes a filter cartridge with one or more folded filter elements. The filter elements are partially arranged in a V-shape with respect to one another and have a ramp-shaped design in their cross-section.

SUMMARY

In an embodiment, the present invention provides a cassette filter for cleaning a fluid, comprising: a frame; and a plurality of filter elements having a filter medium provided with a folding, the plurality of filter elements being accommodated in a frame such that at least two adjoining filter elements of the plurality of filter elements are arranged at an acute angle to one another and form a V-shaped arrangement, wherein each of the plurality of filter elements has folded edges which are formed by fold peaks and fold valleys and extend perpendicularly to legs of the acute angle, and wherein each filter element of the plurality of filter elements is provided with foldings such that a height of the respective filter element is smaller at all edge regions than a height in a central region of the respective filter element, and smaller folding surfaces than the central region result at the edge regions.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
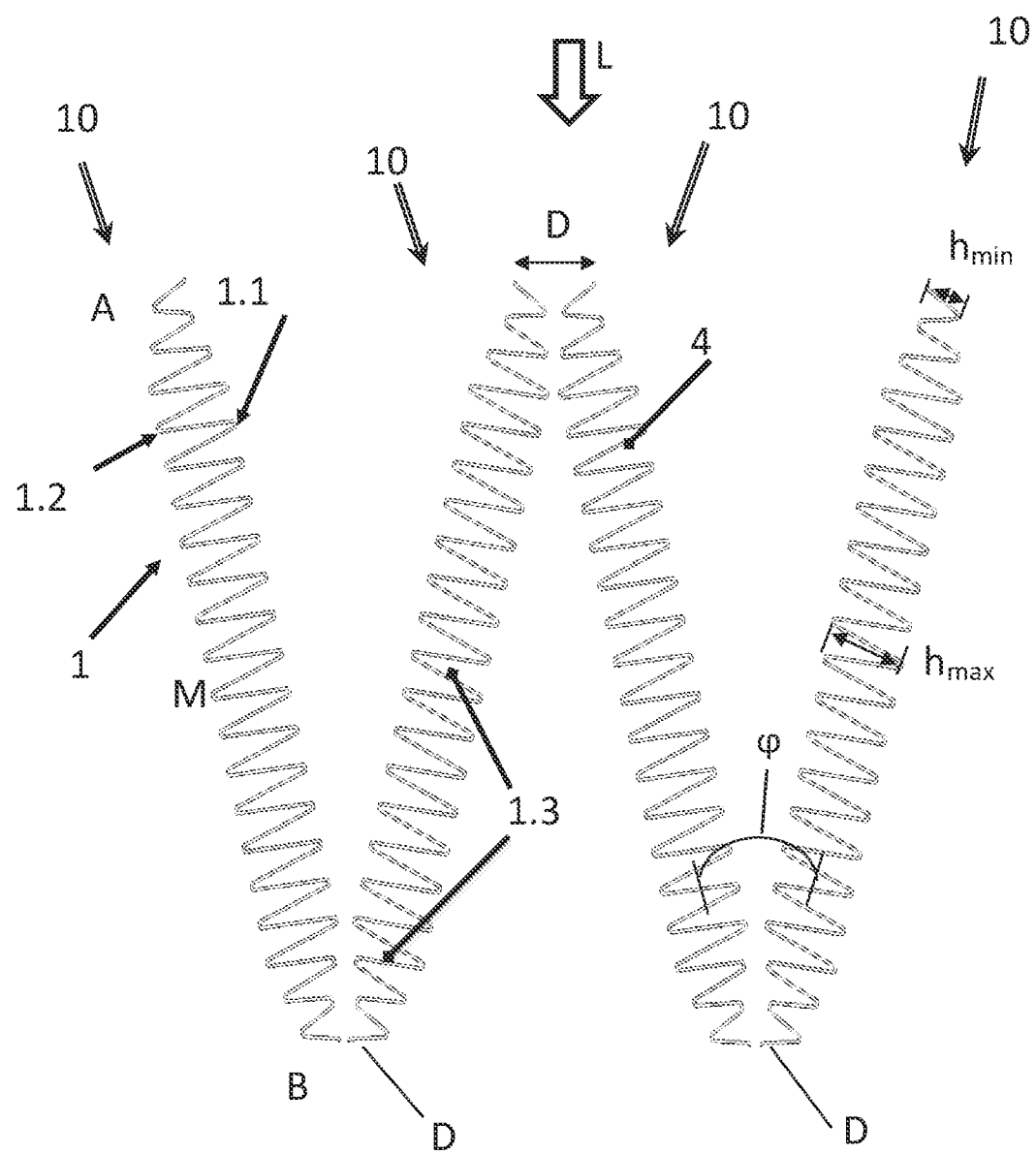
FIG. 1 Filter elements for a cassette filter according to the invention

In an embodiment, the present invention provides a cassette filter with reduced pressure loss.

The cassette filter for cleaning a fluid according to the invention has a frame and a plurality of special filter elements as described below. The filter elements are accommodated in the frame in such a way that in each case at least two filter elements adjoining one another are arranged at an acute angle φ to one another, wherein the longitudinal axes of adjoining filter elements form the legs of the acute angle. The filter elements thus have a V-shaped arrangement. The fold edges formed by fold peaks and fold valleys extend perpendicularly to the legs of the acute angle φ. They advantageously have a special folding.

According to the invention, folding is done such that the height of the filter element is smaller in all edge regions (A, B) than in its central region, which lies approximately in the center between the edge regions, and smaller fold areas result in the edge regions than in its central region. The longitudinal axis and longitudinal direction of a filter element lead from one edge region A to the other edge region B. Preferably, a reduced height is provided in all edge regions where filter elements adjoin one another. The height is thus smaller in all edge regions (A, B) of all filter elements than in the central regions of the filter elements. The filter elements then have an identical construction and can be produced cost-effectively.

This means that the height of the filter element first increases from a first edge region (i.e. a first side A) to another edge region (i.e. to the other, second side B) of the filter element and then decreases again. This feature does not concern the thickness of the filter medium from which the filter element is formed, but rather the height of the filter element, the pleat height; i.e., the "height difference" between the fold peak and fold valley. Consequently, in all variants there is a change in the height of the filter element over its extension in the longitudinal direction.

The use of the filter elements according to the invention in a cassette filter advantageously achieves that the regions in which no air can flow through the filter can be designed more slenderly, i.e., the boundary regions in which the filter elements adjoin one another and are sealed. The edge regions on the frame of the filter can also be designed more slenderly. Thanks to the filter elements with special folding, this problematic region can be significantly reduced. The reduction results in a lower pressure loss of the cassette filter and thus a better filtration performance.

Furthermore, the filtration performance is improved compared to uniformly pleated filter media with only minimal height, since the effective filter area of the filter medium is increased in the middle region thanks to the larger folding surfaces.

In the side view, a particular folded filter element preferably has a design having a straight edge and a convex edge, that is to say a curve which extends away from the straight edge and approaches it again.

It has been found to be very advantageous that a particular filter element has a rectangular shape in plan view. A filter element of this shape can be easily used in rectangular frames of a filter.

It has further been found to be particularly advantageous that the height of the filter element at its center lies within a range of $h_{max}$=20 to 50 mm, and at the edge regions with a reduced height within a range of $h_{min}$=5 to 20 mm.

In a further development of the cassette filter, the filter medium is a nonwoven or a glass fiber paper, and/or the filter medium contains a membrane.

It appears advantageous if two filter elements of the cassette filter adjoining each other are glued to one another.

In a further development of the cassette filter, a particular filter element is designed using the mini-pleat technique with hot-melt fixing of the folding surfaces. In this case, a hot-melt adhesive thread serves as a spacer between the folding surfaces. This results in an optimal utilization of the filter surface of all folding surfaces while at the same time improving the stability of a particular filter element.

The described invention and the described advantageous further embodiments of the invention constitute advantageous further embodiments of the invention also in combination with one another, insofar as this is technically reasonable.

The invention will now be explained in more detail using the accompanying figures. Corresponding elements and parts are provided with the same reference signs in the figures. For the sake of better clarity of the figures, a presentation that is true to scale has been dispensed with.

In FIG. 1, four filter elements 10 for a filter 200 according to the invention are shown. A particular filter element 10 is provided with folding 1 across its surface. In comparison with known pleated filter elements, the filter medium 4 of the filter element 10 can be provided with special folding 1.

The filter element 10 has folding 1 such that a plurality of fold peaks 1.1 and fold valleys 1.2 are formed.

The folding 1 is not a known Leporello folding or zigzag folding, which is commonly also referred to as pleating and which has nothing but rectangular fold sections 1.3 of equal size. Rather, the folding 1 is designed as a special folding 1 so that folding surfaces or folding sections 1.3 of different sizes result. The folding 1 is such that the height $h_{min}$ of the filter element in the edge regions A, B is smaller than the height $h_{max}$ in its central region M, and there are thus smaller fold areas 1.3 in the edge regions A, B than in its central region M.

Figure 3A:
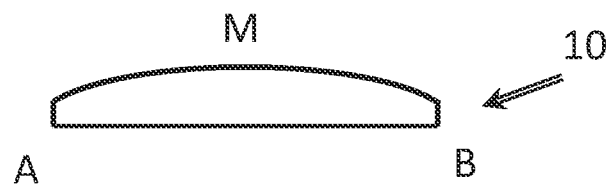
FIGS. 3*a-c* Examples of different shapes of a filter element in the side view
Figure 3B:
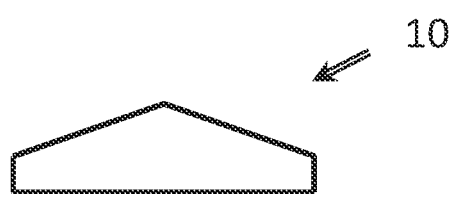
Figure 3C:
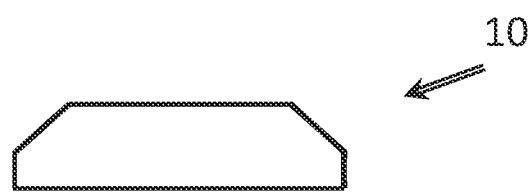

In the side view of the folded filter element 10, the roof-shaped configuration can be seen, cf. FIGS. 3a-c.

In an alternative embodiment, not shown, the height of the filter element 10 is reduced only in the regions D to $h_{min}$ min where two filter elements 10 adjoin one another. The height at the free end of the completely left and right filter element in the representation in FIG. 1 can then also have the greater height $h_{max}$. This embodiment variant is somewhat disadvantageous, however, since the edge regions at the frame of the filter are wider and represent interfering regions which result in a greater pressure loss.

Figure 2:
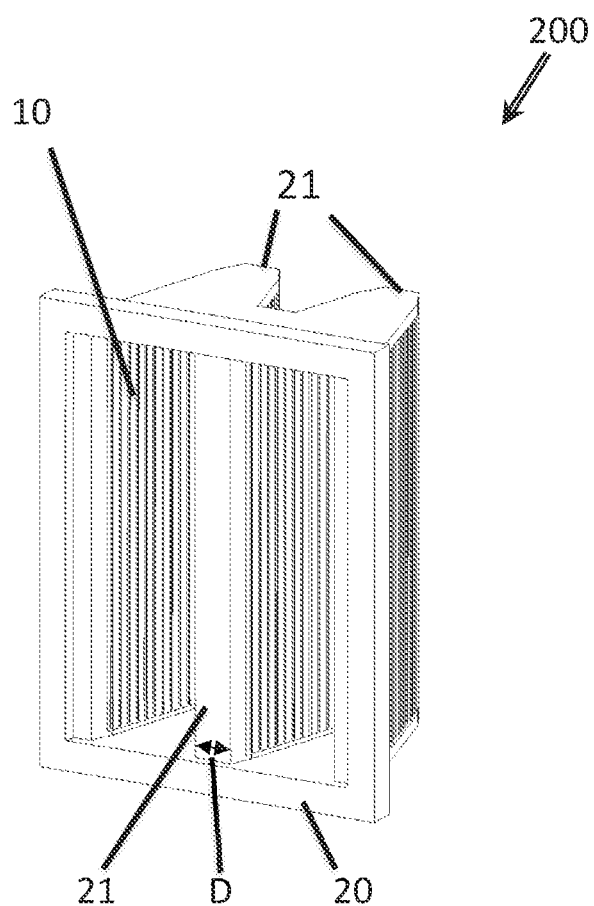
FIG. 2 A cassette filter according to the invention

FIG. 1 illustrates how the filter elements 10 described above can be positioned with respect to one another so that the filter elements 10 are arranged at an acute angle φ to one another and can be accommodated by a frame of a cassette filter 200 (see FIG. 2). As a result, the filter elements 10 have a V-shaped arrangement. By using these filter elements 10 in contrast to filter elements which are not provided with a special folding 1, 14, the region D can be reduced, wherein the region D is that which lies in the boundary region thorough which air L cannot flow because of the seal by the filter elements. By reducing this region D, the sealed no-flow area can be reduced, and the pressure differential of a filter 200 with such filter elements 10 can be reduced.

The filter elements 10 are received by a frame 20 and thus form a cassette filter 200 with a V-shaped arrangement of the filter elements 10 (see FIG. 2). In the boundary region where the filter elements 10 adjoin one another and are sealed against one another, strip-shaped cross-members 21 could be provided. In order to seal the filter elements 10 with respect to the frame 20 and the cross-members 21 and for there to be no by-passes where air L can pass through the filter 200 without passing through the filter elements 10, the filter elements 10 can be glued together in the region of the cross-member 21. The filter elements 10 can also be glued to the frame 20. Such an adhesive bond can be created, for example, by encapsulation with PUR adhesive. The cross-members 21 can likewise be designed narrow. As a result, the region D through which air L cannot flow can be kept small.

In FIGS. 3a to 3c, the side views of a filter element 10 is shown in different embodiment variants. Common to all is a design with a straight edge and a convex edge, wherein, depending on the shape of the convex edge, a barrel-shaped, saddle-shaped or hip-shaped design is conceivable, conceptually based on known house roof shapes.

In alternative embodiments, designs with two convex edges are conceivable, wherein approximately oval or elliptical or diamond-shaped or hexagonal side views of a filter element 10 result, which can in particular be mirror-symmetrical to a central axis.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1. Special folding
1.1 Fold peak
1.2 Fold valley
1.3 Fold surface
4 Filter medium
10 Filter element with special folding
20 Frame
21 Cross-member
200 Cassette filter
$h_{min,\ max}$ Height of filter element
A First side (edge region)
B Second side
D Region through which air cannot flow
L Air flow
M Central region
φ Angle between adjoining filter elements

What is claimed is:

1. A cassette filter for cleaning a fluid, comprising:
a frame; and
a plurality of filter elements having a filter medium provided with a folding, the plurality of filter elements being accommodated in a frame such that at least two adjoining filter elements of the plurality of filter elements are arranged at an acute angle to one another and form a V-shaped arrangement,
wherein each of the plurality of filter elements has folded edges which are formed by fold peaks and fold valleys and extend perpendicularly to legs of the acute angle,
wherein each of the plurality of filter elements comprises only two edge regions, each edge region being disposed at a respective end of a respective filter element, each of the plurality of filter elements further comprising a central region disposed between the edge regions of the respective filter element, and
wherein each filter element of the plurality of filter elements is provided with foldings such that a height of the respective filter element is smaller at all edge regions than a height in the central region of the respective filter element, and smaller folding surfaces than the central region result at the edge regions.

2. The cassette filter of claim 1, wherein in a side view, a folded filter element has a design with a straight edge and a convex edge.

3. The cassette filter of claim 1, wherein the height of the respective filter element at the center of the respective filter element lies within a range of $h_{max}$=20 to 50 mm, and in the edge regions within a range of $h_{min}$=5 to 20 mm.

4. The cassette filter of claim 1, wherein the filter medium comprises a nonwoven or fiberglass paper.

5. The cassette filter of claim 1, wherein the filter medium contains a membrane.

6. The cassette filter of claim 1, wherein two filter elements adjoining each other are glued to one another.

7. The cassette filter of claim 1, wherein a particular filter element of the plurality of filter elements is designed with a mini-pleat technique with hot-melt fixing of the fold surfaces.

* * * * *